Figure 1:
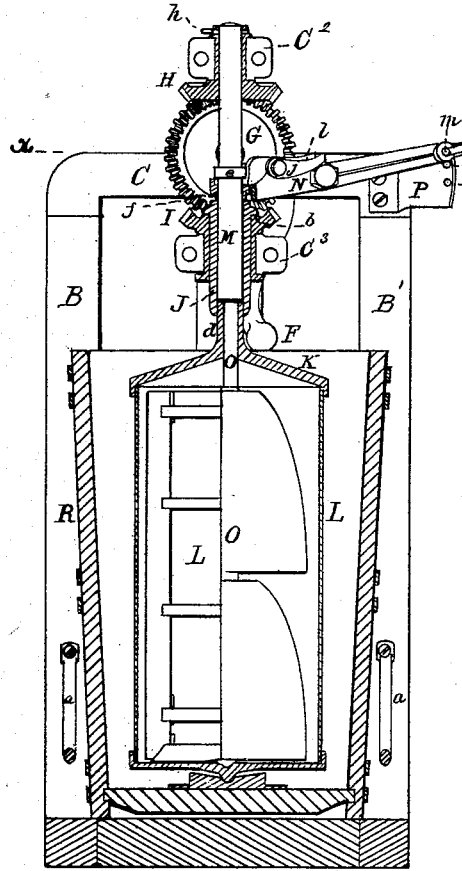

J. DOOLING.
Ice-Cream Freezers.

No. 149,032. Patented March 31, 1874.

Witnesses.
N. C. Lombard
L. A. Wood

Inventor.
James Dooling

UNITED STATES PATENT OFFICE.

JAMES DOOLING, OF BOSTON, MASSACHUSETTS.

IMPROVEMENT IN ICE-CREAM FREEZERS.

Specification forming part of Letters Patent No. 149,032, dated March 31, 1874; application filed March 5, 1874.

*To all whom it may concern:*

Be it known that I, JAMES DOOLING, of Boston, in the county of Suffolk and State of Massachusetts, have invented certain new and useful Improvements in Ice-Cream Freezers, of which the following, taken in connection with the accompanying drawings, is a specification:

My invention relates, in the first place, to the arrangement of the mechanism for imparting a rotary motion to the cream-holder and the beater in opposite directions, whereby either the cream-holder or the beater may be rotated while the other is held in a state of rest, or both may be revolved at the same time in opposite directions, at the will of the operator; and it consists in the combination and arrangement of a horizontal shaft, mounted in suitable bearings in a fixed frame, and provided at one end with suitable means for imparting thereto a rotary motion, and at the other end with a bevel-gear wheel, which meshes into and acts upon two other bevel-wheels, provided with long hollow hubs, upon which are turned journals, by which they are mounted in bearings provided for the purpose, one above and the other below the first-mentioned gear, with their axes in the same vertical line, and at right angles to the driving-shaft, the upper end of the hub of the lower gear being provided with one-half of a clutch-coupling, by which it may be coupled to a short sleeve-shaft, which has its bearing in the hollow hub of said gear, said sleeve being provided with the other half of said clutch-coupling near its upper end, and a suitable socket in its lower end to couple with the hub of the cover to the cream-holder, and cause it to revolve therewith. The sleeve-shaft is so fitted to the hub of the gear that said gear is free to revolve thereon when the clutch is disengaged. My invention further consists in the combination, with said sleeve-shaft, mounted and operated as set forth, of a central spindle or shaft, provided with a socket at its lower end, by which it may be coupled to the beater-shaft, and having its bearings in said sleeve-shaft and the hollow hub of the upper gear, and so fitted thereto that it may revolve freely in said sleeve, or it may be held stationary while the sleeve and the upper gear are revolved in opposite directions. It further consists in the use of a pin or key for connecting the upper gear to said spindle, so as to compel it to revolve therewith, said pin or key being so fitted and applied that it may be withdrawn at pleasure. My invention relates in the second place to the mechanism for uncoupling the driving-gear from the cream-holder and the beater, one or both, and the means employed to prevent motion being imparted to either the cream-holder or the beater when uncoupled from the driving mechanism; and it consists in forming a groove around the upper end of the sleeve-shaft, with which the pins of a shipper fork engage, the lever upon which said fork is formed being mounted upon a fulcrum-pin set in the fixed frame of the apparatus, and provided at its handle end with a suitable locking device, by means of which it may be held securely in either of three positions, viz: In position to couple the sleeve-shaft to the gear in the hub of which it has its bearing; in a position to uncouple said sleeve and gear, and in a position to raise said sleeve so as to uncouple it from the cream-holder. My invention further consists in the formation of a collar upon the central spindle, so located thereon that the upper end of the sleeve-shaft will just come in contact therewith when it has been raised by the action of the shipper-lever sufficiently high to uncouple said sleeve from its inclosing-gear. My invention further consists in the formation, upon the upper end of the sleeve-shaft, and at a suitable point upon the central spindle, of one or more teeth notches or holes, and the use in conjunction therewith of two pawls, pivoted to the shipper-lever, or to any convenient point upon the frame, said pawls and teeth notches or holes serving the purpose of preventing the revolution of either the cream-holder or beater when they are uncoupled from the driving mechanism.

This present invention is an improvement upon the invention patented to me October 20, 1868, whereby the principles of operation therein contained are made applicable to the operation of a single cream-holder and beater.

Figure 4:
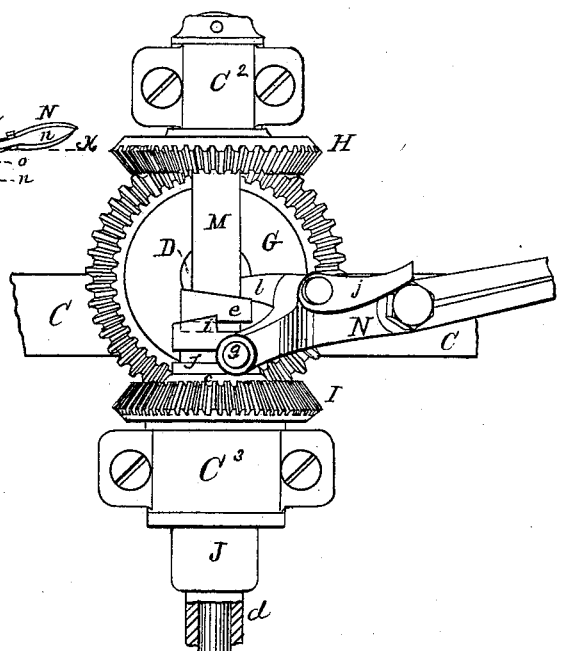
Figure 2:
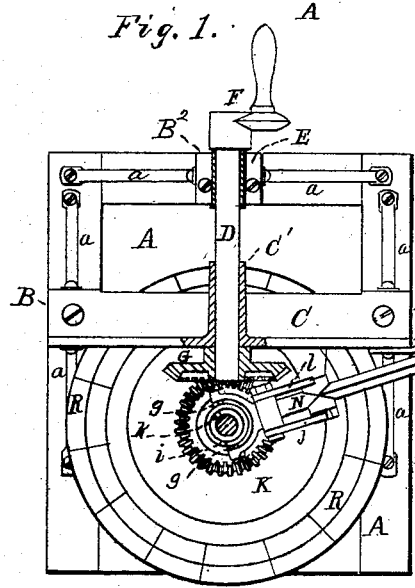
Figure 3:
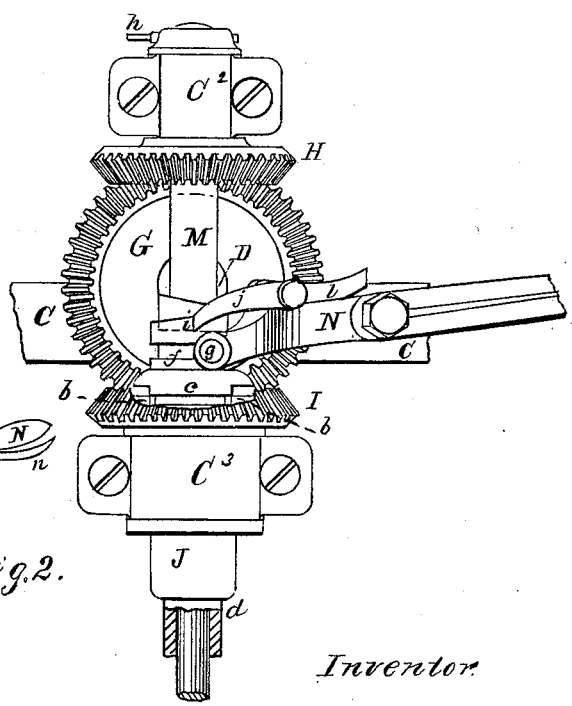

In the drawings, Figure 1 is a vertical section through the center of the cream-holder and ice-tub, and at right angles to the driving-shaft. Fig. 2 is a horizontal section on line x x, on Fig. 1. Fig. 3 is a front elevation of the driving mechanism drawn to an enlarged scale, and showing the parts in position for revolving the beater while the cream-holder is held stationary; and Fig. 4 is a similar view with the parts in position for revolving the cream-holder while the beater is held stationary. In Figs. 1 and 2 the parts are shown in position for revolving the cream-holder and the beater in opposite directions.

A is a base or platform, upon which are erected three standards, B, B$^1$, and B$^2$, firmly secured thereto, and held in an upright position by the braces a a. C is a metallic frame, secured to the tops of the standards B and B$^1$, and provided with the pipe box or hub C$^1$, which forms one of the bearings of the horizontal shaft D, the other bearing, E, of which is secured to the top of the standard B$^2$. The frame C is provided with two arms, one extending above and the other below the pipe-box C$^1$, and extending forward in lines parallel to the horizontal driving-shaft D, said arms terminating in the boxes C$^2$ and C$^3$. The driving-shaft D has secured to its outer end the crank F, or (if the machine is to be operated by power) a pulley, by means of which rotary motion may be imparted thereto, and to its inner end is secured the bevel-gear wheel G, which meshes into and acts upon the bevel-wheels H and I, mounted, respectively, in the boxes C$^2$ and C$^3$. The gears H and I are each provided with long hollow hubs, upon which are turned journals, having shoulders at either end thereof, by means of which they are so mounted in the boxes C$^2$ and C$^3$ that they may revolve freely therein, independently of any shaft passing through the same, and at the same time be perfectly self-sustaining. J is a short sleeve-shaft, having its bearing in the hollow hub of the gear I, and so fitted thereto that it may revolve freely therein, and at the same time be moved endwise therein, at the will of the operator. The upper end of the hub of the gear I has formed thereon one-half of a clutch-coupling, b, constructed to engage with a corresponding clutch, c, formed on the upper end of the sleeve-shaft J, by means of which the gear I may be coupled to the sleeve-shaft J, and compel it to revolve therewith, at the will of the operator. The lower end of the sleeve-shaft J has formed therein a socket to fit the upper end of the hub d, projecting upward from the center of the cover K of the cream-holder L. The upper end of said hub may be square, or of any other suitable form, to engage with the sleeve-shaft, and compel the cream-holder to revolve when the sleeve-shaft revolves. M is a central vertical shaft or spindle, having its bearings in the sleeve-shaft J and the hollow hub of the gear H, and so fitted thereto that it may revolve freely in said sleeve-shaft and with said gear H; or that both the gear and sleeve may revolve freely thereon while the spindle is held stationary, and also so that it may be moved endwise through the hub of the gear H. The spindle M is provided with a collar, e, so located thereon that the upper end of the sleeve-shaft J will come in contact therewith when said sleeve has been raised sufficiently to disengage it from the gear I. The sleeve-shaft J has formed around its upper end a groove, f, into which the pins g of the shipper N fit, by means of which the sleeve-shaft may be raised to disengage it from the gear I, and, by a further movement of the shipper, the sleeve J may be raised still farther, carrying with it the spindle M, and completely uncoupling the driving mechanism from the cream-holder and the beater. The spindle M has formed in its lower end a socket to fit the squared upper end of the beater-shaft O, from which it may be readily disengaged by being raised, as above described. The gear H is engaged with the spindle M so as to cause it to revolve therewith by means of a pin, h, which passes through the upper end of the hub of said gear and the spindle, said pin being so constructed and fitted that it may be readily and easily removed to disengage said gear from said spindle, when it is desirable to stop the motion of the beater; or when it is necessary to raise the spindle to uncouple the operating mechanism from the cream-holder and the beater, as above described. To prevent the cream-holder from being revolved or carried around with the beater by the resistance to the passage of the beater through the cream, a tooth or shoulder, i, is formed upon the upper end of the sleeve-shaft J, which engages with the end of the pawl j, as seen in Fig. 3, effectually preventing any further revolution of the sleeve-shaft, or of the cream-holder in that direction. The spindle M is also provided with a similar tooth or shoulder, k, which, in the case shown, is formed on the upper side of the collar e, and engages with the pawl l, as seen in Fig. 4, and prevents any revolution of the spindle and the beater in the direction in which the cream-holder is revolving. The pawls j and l are pivoted to the shipper-lever N, as shown, or they may be pivoted to a stationary stand projecting from the frame C. The shipper-lever N is secured in the desired position by the pin m, which enters holes n o in the stand P, being forced therein by the power of a spring, and withdrawn therefrom by pressing upon the lever n. R is the ice-tank, constructed in the usual manner, and placed upon the platform A.

The operation of my improved machine is as follows: The cream being placed in the cream-holder L, and the beater O being placed in position therein, the cover K is firmly secured to the cream-holder, and the whole is placed in position in the ice-tank R and well packed with ice, all in a well-known manner. The outer end of the shipper-lever N is now depressed till the pin m enters the hole n, the pin h having previously been withdrawn from the hub of the gear H to allow of this being done. The ice-tank with contents is now placed upon the platform A in such a position that the center of the cream-holder shall be exactly in line with the axis of the spindle, when the outer end of the shipper-handle is raised until the pin $m$ enters the upper hole in the stand P, the fork end of said shipper causing the sleeve-shaft J to descend and embrace the hub $d$ of the cream-holder cover K, while at the same time the spindle M descends by its own weight, and is coupled to the squared upper end of the shaft of the beater O. The pawl $l$ is now thrown over, so as to rest upon the upper surface of the collar $e$ on the spindle M, as seen in Fig. 4. If the main shaft D is now revolved, the cream-holder will revolve while the beater is held stationary.

When the cream has become sufficiently cooled to admit of more violent agitation, the pin $h$ is inserted through the hub of the gear H and the spindle, and the pawl $l$ is thrown back away from the spindle, as seen in Fig. 1, when, if the main shaft D be rotated, the cream-holder and the beater will both be revolved, but in opposite directions. At the proper stage in the operation the outer end of the shipper-lever is depressed till the pin $m$ enters the hole $o$ in the stand P, when the sleeve J will be disconnected from its operating gear. The pawl $j$ is now thrown over so that its point rests upon the upper end of the sleeve, as seen in Fig. 3, when a continued rotation of the shaft D will cause the beater to revolve while the cream-holder is held stationary, which operation is continued until the cream is sufficiently frozen to be removed from the cream-holder, when the pin $h$ is withdrawn and the outer end of the shipper-lever is depressed till the pin $m$ enters the hole $n$ in the stand P, when the operating mechanism is uncoupled from the cream-holder, and the beater and the ice-tank and contents may be removed from the platform for the purpose of emptying and refilling the cream-holder.

What I claim as new, and desire to secure by Letters Patent of the United States, is—

1. The combination and arrangement of the three bevel-gear wheels G, H, and I, mounted in suitable bearings in a fixed frame supported independently of the ice-tank or cream-holder, the sleeve-shaft J and the spindle M, constructed to be rotated by said gears H and I to move endwise through the same, or to be held stationary at will, substantially as described.

2. The sleeve-shaft J, provided with the clutch $c$, in combination with the gear-wheel I, mounted by a shouldered journal in a suitable bearing, and provided with the clutch $b$, all arranged to operate substantially as described.

3. The combination of the spindle M, the gear H, and the pin $h$, arranged and operating substantially as described.

4. The rotating reciprocating spindle M, provided with the collar $e$ and tooth $k$, in combination with the sleeve-shaft J, the shipper-lever N, and the pawl $l$, arranged to operate substantially as described.

5. The sleeve-shaft J, provided with the tooth or shoulder $i$, in combination with the pawl $j$, substantially as described.

Executed at Boston this 28th day of February, 1874.

JAMES DOOLING.

Witnesses:
N. C. LOMBARD,
S. A. WOOD.